(12) United States Patent
Johnson et al.

(10) Patent No.: US 6,833,795 B1
(45) Date of Patent: Dec. 21, 2004

(54) UNDERGROUND UTILITY DETECTION SYSTEM AND METHOD EMPLOYING GROUND PENETRATING RADAR

(75) Inventors: Dennis J. Johnson, Salem, NH (US); Eugene Bogatyrev, Salem, NH (US); Kevin Alft, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 464 days.

(21) Appl. No.: 09/727,356

(22) Filed: Nov. 30, 2000

Related U.S. Application Data

(60) Provisional application No. 60/168,075, filed on Nov. 30, 1999.

(51) Int. Cl.[7] ................................................. G01V 1/00
(52) U.S. Cl. ............................... 340/853.5; 340/853.6; 340/853.8; 166/255.1
(58) Field of Search .............................. 175/45, 46, 48, 175/50, 61, 62; 166/255.2, 255.1; 73/152.03, 152.17; 340/853.5, 853.8; 324/326, 329, 324, 333

(56) References Cited

U.S. PATENT DOCUMENTS

| | | | |
|---|---|---|---|
| 4,027,307 A | * | 5/1977 | Litchford ....................... 342/32 |
| 4,297,699 A | | 10/1981 | Fowler et al. |
| 4,430,653 A | | 2/1984 | Coon et al. |
| 4,492,865 A | | 1/1985 | Murphy et al. |
| 4,686,475 A | | 8/1987 | Kober et al. |
| 4,814,768 A | | 3/1989 | Chang |
| 4,896,116 A | | 1/1990 | Nagashima et al. |
| 5,469,155 A | * | 11/1995 | Archambeault et al. . 340/853.4 |
| 5,499,029 A | | 3/1996 | Bashforth et al. |
| 5,553,407 A | | 9/1996 | Stump |
| 5,659,985 A | | 8/1997 | Stump |
| 5,698,981 A | * | 12/1997 | Mercer ....................... 324/329 |
| 5,704,142 A | | 1/1998 | Stump |
| 5,720,354 A | | 2/1998 | Stump et al. |
| 5,769,503 A | | 6/1998 | Stolarczyk et al. |
| 5,819,859 A | | 10/1998 | Stump et al. |
| 5,867,117 A | * | 2/1999 | Gogineni et al. ............. 342/22 |
| 5,904,210 A | | 5/1999 | Stump et al. |
| 5,933,014 A | | 8/1999 | Hartrumpf et al. |
| 6,088,294 A | | 7/2000 | Leggett, III et al. |
| 6,225,941 B1 | * | 5/2001 | Gogineni et al. ............. 342/22 |
| 6,308,787 B1 | | 10/2001 | Alft et al. |
| 6,315,062 B1 | | 11/2001 | Alft et al. |
| 6,389,360 B1 | | 5/2002 | Alft et al. |

* cited by examiner

*Primary Examiner*—Hung Dang
(74) *Attorney, Agent, or Firm*—Crawford Maunu PLLC

(57) ABSTRACT

An apparatus and method are employed to detect underground objects for use with a horizontal directional drilling (HDD) machine. A drill pipe is configured to cooperate with the HDD machine to produce a horizontal bore. A transmit apparatus is provided with the drill pipe and transmits electromagnetic probe signals ahead and/or to the side of the drill pipe. A receive apparatus is provided with the drill pipe and receives electromagnetic return signals resulting from the probe signals. A processor, coupled to the transmit and receive apparatuses, compares at least some of the return signals, and generates an alert signal indicative of a detected object in proximity with the drill pipe. HDD machine activity is modified, such as by reducing or halting drill pipe advancement, in response to the alert signal.

60 Claims, 13 Drawing Sheets

PLAN VIEW

FRONT VIEW

PLAN VIEW

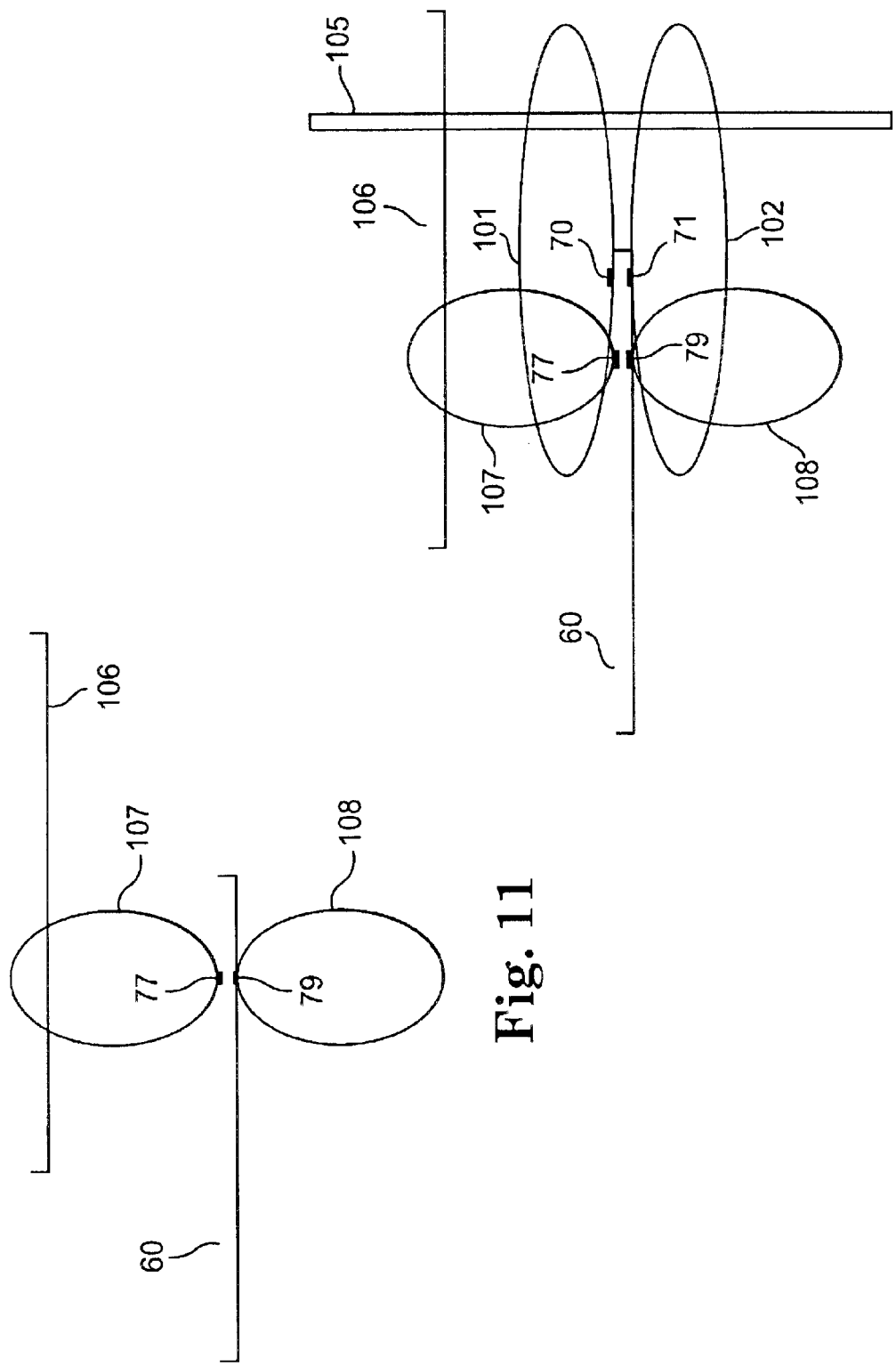

_US 6,833,795 B1_

UNDERGROUND UTILITY DETECTION SYSTEM AND METHOD EMPLOYING GROUND PENETRATING RADAR

RELATED APPLICATIONS

This application claims the benefit of U.S. Provisional Application No. 60/168,075, filed Nov. 30, 1999, which is hereby incorporated herein by reference in its entirety.

BACKGROUND OF THE INVENTION

The present invention relates generally to the field of underground boring and, more particularly, to a system and method of detecting buried objects and utilities in proximity with a drill pipe/cutting tool during underground boring system operation.

Utility lines for water, electricity, gas, telephone, and cable television are often run underground for reasons of safety and aesthetics. In many situations, the underground utilities can be buried in a trench which is then back-filled. Although useful in areas of new construction, the burial of utilities in a trench has certain disadvantages. In areas supporting existing construction, a trench can cause serious disturbance to structures or roadways. Further, there is a high probability that digging a trench may damage previously buried utilities, and that structures or roadways disturbed by digging the trench are rarely restored to their original condition. Also, an open trench may pose a danger of injury to workers and passersby.

The general technique of boring a horizontal underground hole has recently been developed in order to overcome the disadvantages described above, as well as others unaddressed when employing conventional trenching techniques. In accordance with such a general horizontal boring technique, also referred to as horizontal directional drilling (HDD) or trenchless underground boring, a boring system is situated on the ground surface and drills a hole into the ground at an oblique angle with respect to the ground surface. A drilling fluid is typically flowed through the drill string, over the boring tool, and back up the borehole in order to remove cuttings and dirt. After the boring tool reaches a desired depth, the tool is then directed along a substantially horizontal path to create a horizontal borehole. After the desired length of borehole has been obtained, the tool is then directed upwards to break through to the earth's surface. A reamer is then attached to the drill string which is pulled back through the borehole, thus reaming out the borehole to a larger diameter. It is common to attach a utility line or other conduit to the reaming tool so that it is dragged through the borehole along with the reamer.

It can be appreciated that contacting or striking an underground utility or other unknown buried obstruction by the drill string and/or cutting head may represent a significant hazard to workers and others near the work site. A common approach to addressing the potential hazards facing workers due to a utility strike, for example, involves the use of an above-ground locator. Although such an approach improves the chances of detecting utilities and obstructions situated ahead of the drill pipe/cutting tool, several factors can negatively influence the accuracy and reliability of above-ground locators, including sensitivity and range limitations, operator skill and interpretive capabilities, changing or undesirable geology, presence of natural or manmade buried structures, and the like.

There exists a need in the excavation industry for an apparatus and methodology for detecting buried objects, such as utilities, lying ahead of an approaching drill string/cutting tool. There exists the further need for such an apparatus and methodology that provides for increased boring safety upon detecting a buried object. The present invention fulfills these and other needs.

SUMMARY OF THE INVENTION

The present invention is directed to an apparatus and method for detecting underground objects for use with a horizontal directional drilling (HDD) machine. In accordance with an embodiment of the present invention, a drill pipe is configured to cooperate with the HDD machine to produce a horizontal bore. A transmit apparatus is provided with the drill pipe and transmits electromagnetic probe signals ahead of the drill pipe. Optionally or in addition, the transmit apparatus transmits electromagnetic probe signals lateral to the drill pipe.

A receive apparatus is provided with the drill pipe and receives electromagnetic return signals resulting from the probe signals. A processor, coupled to the transmit and receive apparatuses, compares characteristics, such as amplitudes, of at least some of the return signals, and generates an alert signal indicative of a detected object in proximity with the drill pipe in response to the processor comparing return signals having about the same amplitude.

The transmit apparatus and receive apparatus, according to one configuration, share one or more common antennae. According to another configuration, the transmit apparatus may include two transmit antennas situated apart from one another on the drill pipe. The two transmit antennas may, for example, be situated about 180 degrees from one another on the drill pipe. The receive apparatus may include a single receive antenna or two or more receive antennas.

According to further configuration, the receive apparatus may include two receive antennas situated apart from one another on the drill pipe. The two receive antennas may, for example, by situated about 180 degrees from one another on the drill pipe. The transmit apparatus may include a single transmit antenna or two or more transmit antennas.

The object detection apparatus may further include an orientation sensor provided with the drill pipe. The orientation sensor generates a horizontal orientation signal indicating that one or more antennae of the transmit and receive apparatuses are oriented along a substantially horizontal plane relative to a surface of the earth. The processor, according to this embodiment, compares the return signal amplitudes in response to the horizontal orientation signal.

The drill pipe may be configured to include an integral or attachable cutting tool, and the receive and transmit apparatuses may be provided with the cutting tool. The drill pipe and the cutting tool may be provided with one or both of receive and transmit apparatuses, respectively.

The processor may be a distributed processor which includes a first processor provided at the drill pipe and a second processor provided at the HDD machine. The distributed processor may also include a processor provided in an above-ground locator or repeater. The first processor may communicate the return signals to the second processor, and the second processor may generate the alert signal. The first processor may alternatively generate the alert signal. The first processor may communicate a processed set of data developed from the return signals to the second processor, in which case the second processor receives the processed data set from the first processor for further processing at the HDD machine.

According to a further embodiment, the underground object detection apparatus includes a side looking object detection apparatus, in addition to or exclusive of a forward looking object detection apparatus. In one configuration, according to this embodiment, the transmit apparatus transmits electromagnetic probe signals lateral to the drill pipe. The receive apparatus receives electromagnetic lateral return signals resulting from the laterally transmitted probe signals. The processor compares amplitudes of at least some of the lateral return signals, and generates an alert signal indicative of a detected object in proximity with a side of the drill pipe in response to the processor comparing lateral return signals having about the same amplitude.

The transmit and receive apparatuses, according to one embodiment, define an impulse or chirp ground penetrating radar apparatus. According to another embodiment, the transmit and receive apparatuses define a stepped-frequency ground penetrating radar apparatus. In accordance with yet another embodiment, the transmit and receive apparatuses define a swept-frequency ground penetrating radar apparatus.

In accordance with another embodiment, an underground object detection apparatus of the present invention includes a horizontal directional drilling (HDD) machine. A drill pipe is coupled to the HDD machine and is controlled by the HDD machine to produce a horizontal bore. A transmit apparatus is provided with the drill pipe and transmits electromagnetic probe signals generally ahead of the drill pipe. A receive apparatus is provided with the drill pipe and receives electromagnetic return signals resulting from the probe signals. The transmit apparatus and receive apparatus may be configured, and have functionality, as described previously.

A first processor is provided proximate the drill pipe and coupled to the transmit and receive apparatuses. The first processor receives return signal data from the receive apparatus. A second processor is provided at the HDD machine. The second processor modifies movement of the drill pipe in response to an alert signal produced from the return signal data by the first or second processor indicative of a detected object in proximity with the drill pipe.

The underground object detection apparatus may include an orientation sensor provided with the drill pipe which generates a horizontal orientation signal indicating that one or more antennae of the transmit and receive apparatuses are oriented along a substantially horizontal plane relative to a surface of the earth. The first or second processor compares return signal amplitudes in response to the horizontal orientation signal.

The first processor may compare amplitudes of at least some of the return signals and, in response to comparing return signals having about the same amplitude, generate the alert signal. Alternatively, the second processor may compare amplitudes of at least some of the return signals and, in response to comparing return signals having about the same amplitude, generate the alert signal.

The second processor, alone or in cooperation with the first processor, may modify movement of the drill pipe in response to the alert signal. For example, the second processor may modify movement of the drill pipe by halting movement of the drill pipe in response to the alert signal. The second processor may modify movement of the drill pipe by reducing a rate of drill pipe displacement or by modifying steering of the drill pipe in response to the alert signal. The second processor may further modify a rate of drill pipe displacement as a function of drill pipe proximity with the object. Also, the first or second processor may modify the alert signal presented to an operator of the HDD machine as a function of drill pipe proximity with the object. Further, the first or second processor may modify the flow of drilling fluid through the drill string, including terminating the flow of such drilling fluid, in response to an alert signal.

According to another configuration of this embodiment, the transmit apparatus transmits electromagnetic probe signals lateral to the drill pipe. The receive apparatus receives electromagnetic lateral return signals resulting from the laterally transmitted probe signals. The first or second processor compares amplitudes of at least some of the lateral return signals, and generates an alert signal indicative of a detected object in proximity with a side of the drill pipe in response to the first of second processor comparing lateral return signals having about the same amplitude.

In accordance with a further embodiment of the present invention, a method of detecting an underground object for use with an HDD machine involves moving a drill pipe/cutting tool using the HDD machine to produce a horizontal bore. The method further involves transmitting, from the drill pipe/cutting tool, electromagnetic probe signals generally ahead of the drill pipe and receiving, at the drill pipe/cutting tool, electromagnetic return signals resulting from the probe signals. Amplitudes of at least some of the return signals are compared, and an alert signal indicative of a detected object in proximity with the drill pipe/cutting tool is generated in response to comparing return signals having about the same amplitude.

Transmitting the probe signals may involve simultaneously transmitting a probe signal from at least two spatially separated locations of the drill pipe. Transmitting the probe signals may also involve transmitting temporally separated probe signals from at least two locations of the drill pipe. Transmitting the probe signals may further involve transmitting a probe signal from at least one location of the drill pipe during each of a number of drill pipe rotations. Receiving the return signals may involve receiving return signals at at least one location of the drill pipe. Receiving the return signals may also involve receiving return signals at at least two spatially separated locations of the drill pipe.

The underground object detection method may further involve generating a horizontal orientation signal indicating that the probe signals and return signals are respectively transmitted and received along a substantially horizontal plane relative to a surface of the earth. In this case, return signal amplitudes may be compared in response to the horizontal orientation signal, which coincides with a time at which the probe signals and return signals are respectively transmitted and received along the substantially horizontal plane.

The underground object detection method may also involve modifying movement of the drill pipe/cutting tool in response to the alert signal. For example, movement of the drill pipe/cutting tool may be halted in response to the alert signal. A rate of drill pipe/cutting tool displacement or steering of the pipe/cutting tool may be modified in response to the alert signal. Further, a response to the alert signal may involve modifying a rate of drill pipe/cutting tool displacement as a function of drill pipe proximity with the object. Also, the alert signal or level of alert criticality presented to an operator of the HDD machine may be modified as a function of drill pipe proximity with the object.

According to another embodiment, the underground object detection method may involve transmitting electromagnetic probe signals lateral to the drill pipe and receiving electromagnetic lateral return signals resulting from the laterally transmitted probe signals. Amplitudes of at least some of the lateral return signals may be compared. An alert signal indicative of a detected object in proximity with a side of the drill pipe is generated in response to comparing lateral return signals having about the same amplitude.

The probe and return signals, according to one embodiment, comprise impulse ground penetrating radar signals. In another embodiment, the probe and return signals comprise stepped-frequency ground penetrating radar signals. In yet another embodiment, the probe and return signals comprise swept-frequency ground penetrating radar signals.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 11 is a plan view illustration of a buried utility pipe falling within the detection field produced by a pair of side looking radar provided on a drill pipe in accordance with an embodiment of the present invention;

FIG. 12 is a plan view illustration of a first buried utility pipe falling within the detection field produced by a pair of side looking radar provided on a drill pipe and a second buried utility pipe falling within the detection field produced by a pair of forward looking radar provided on a drill pipe in accordance with an embodiment of the present invention;

Figure 1:
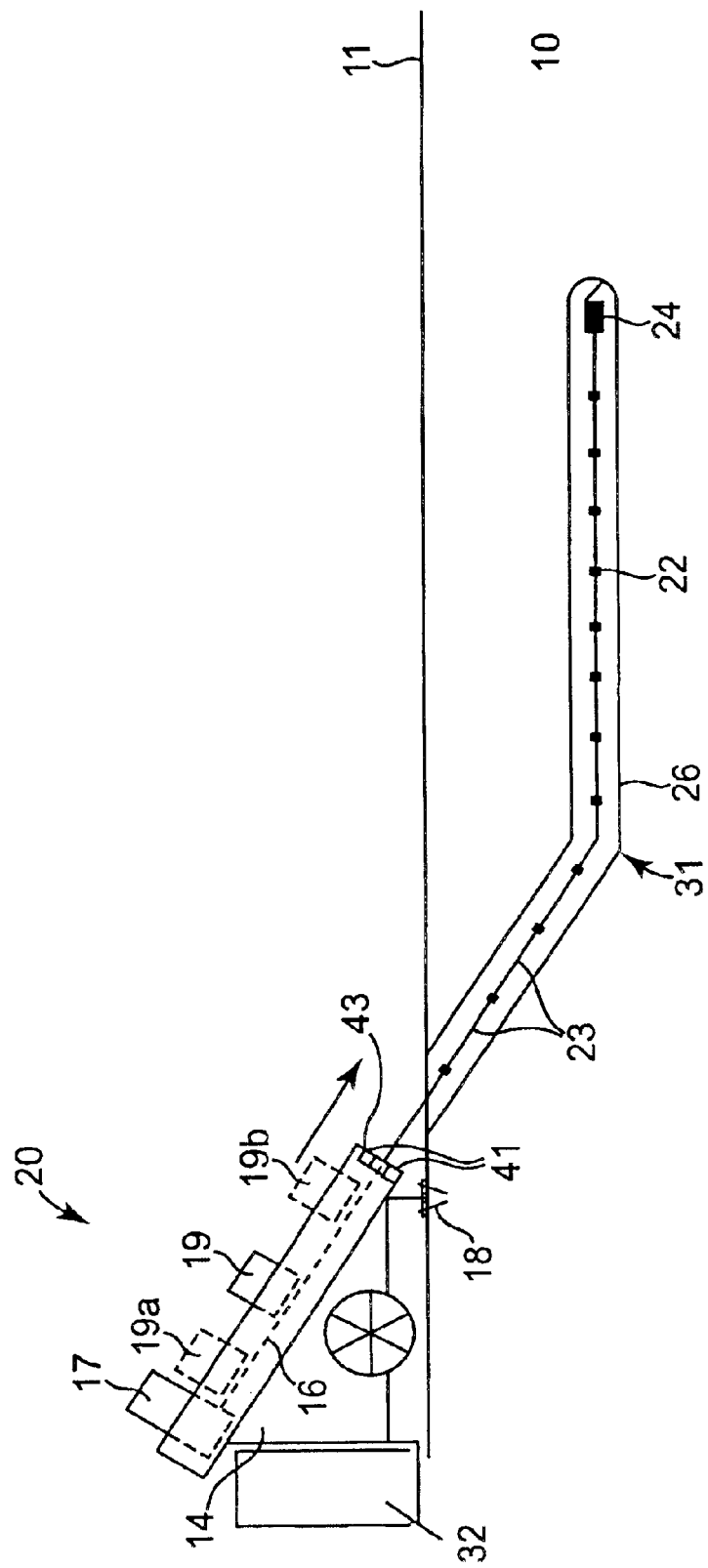
FIG. 1 shows a horizontal directional drilling (HDD) machine producing a horizontal bore through the earth by use of a drill pipe/cutting tool and employing an underground object detection apparatus and method of the present invention.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF THE EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

Referring now to the figures and, more particularly to FIG. 1, there is illustrated an embodiment of a horizontal directional drilling (HDD) machine 20 which incorporates an object detection control system and methodology of the present invention. FIG. 1 illustrates a cross-section through a portion of ground 10 where a horizontal directional drilling operation takes place. The HDD machine 20 is situated aboveground 11 and includes a platform 14 on which is situated a tilted longitudinal member 16. The platform 14 is secured to the ground by pins 18 or other restraining members in order to prevent the platform 14 from moving during the drilling or boring operation. Located on the longitudinal member 16 is a thrust/pullback pump 17 for driving a drill string 22 in a forward and/or reverse longitudinal direction. The drill string 22 is made up of a number of drill string members or rods 23 attached end-to-end.

Also located on the tilted longitudinal member 16, and mounted to permit movement along the longitudinal member 16, is a rotation motor or pump 19 for rotating the drill string 22 (illustrated in an intermediate position between an upper position 19*a* and a lower position 19*b*). In operation, the rotation motor 19 rotates the drill string 22 which has a cutting head or reamer 24 attached at the end of the drill string 22.

A typical boring operation takes place as follows. The rotation motor 19 is initially positioned in an upper location 19*a* and rotates the drill string 22. While the boring tool 24 is rotated, the rotation motor 19 and drill string 22 are pushed in a forward direction by the thrust/pullback pump 17 toward a lower position into the ground, thus creating a borehole 26.

The rotation motor 19 reaches a lower position 19*b* when the drill string 22 has been pushed into the borehole 26 by the length of one drill string member 23. With the rotation motor 19 situated at lower position 19*b*, a clamp 41 then grips the drill string to 22 to stop all downhole drill string movement. The rotation motor 19 is then uncoupled from the clamped drill string 22 and pulled back to upper location 19a. A new drill string member or rod 23 is then added to the drill string 22 either manually or automatically. The HDD controller 50 may coordinate the manipulation of drill rods in cooperation with an automatic rod loader apparatus of a known type, such as that disclosed in commonly assigned U.S. Pat. No. 5,556,253, which is hereby incorporated herein by reference in its entirety. The clamping mechanism then releases the drill string and the thrust/pullback pump 17 drives the drill string 22 and newly added rod 23 into the borehole. The rotation motor 19 is thus used to thread a new drill string member 23 to the drill string 22, and the rotation/push process is repeated so as to force the newly lengthened drill string 22 further into the ground, thereby extending the borehole 26.

Commonly, water or other fluid is pumped through the drill string 22 by use of a mud or water pump. If an air hammer is used as the cutting implement 24, an air compressor is employed to force air/foam through the drill string 22. The water/mud or air/foam flows back up through the borehole 26 to remove cuttings, dirt, and other debris. A directional steering capability is provided for controlling the direction of the boring tool 24, such that a desired direction can be imparted to the resulting borehole 26. Exemplary systems and methods for controlling an HDD machine of the type illustrated in the Figures are disclosed in commonly assigned U.S. Pat. Nos. 5,746,278 and 5,720,354, which are hereby incorporated herein by reference in their respective entireties.

Figure 2:
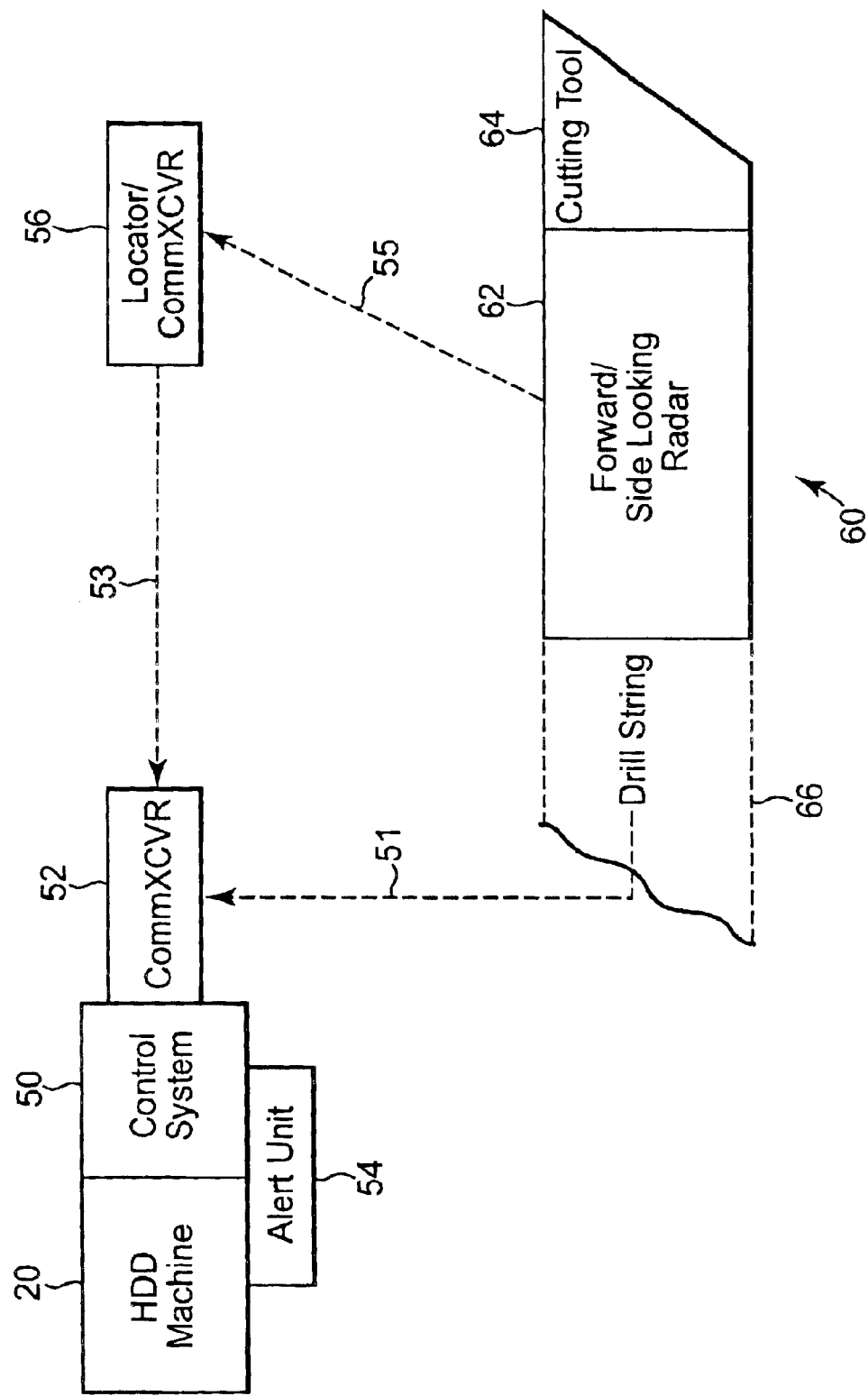
FIG. 2 illustrates an object detection apparatus which includes a drill pipe/cutting tool equipped with forward and/or side looking radar for detecting buried obstructions in accordance with an embodiment of the present invention.

FIG. 2 is a block diagram depicting several components of an underground object detection system for use in horizontal directional drilling in accordance with an embodiment of the present invention. The system embodiment shown in FIG. 2 includes an HDD machine 20 which is mechanically coupled to a drill string or pipe 66. The HDD machine 20 may be of a type described above or other type of drilling machine capable of displacing drill string 66 through the earth to produce a generally horizontal bore.

HDD machine 20 typically includes a control system 50 that controls, among other functions, the overall operation of the HDD machine 20. Control system 50 includes one or more processors that implement control logic to process HDD machine sensor data, operator inputs, downhole data, and other related data to moderate HDD machine operation and performance. An exemplary system and methodology for controlling the displacement and rotation of a drill string 66 and cutting tool 64 is disclosed in commonly assigned U.S. Pat. No. 5,746,278, which is hereby incorporated herein by reference in its entirety.

In FIG. 2, a downhole object detection system is depicted to include an object detection unit 60 partially or entirely housed within drill string 66. Object detection unit 60 may be disposed in a sonde or other housing situated adjacent a cutting tool 64. Alternatively, all or a portion of object detection unit 60 may be housed integral with the cutting tool 64. For example, various electronic components of object detection unit 60 may be housed in a drill pipe portion adjacent cutting tool 64, while one or more object detectors may be positioned on or within cutting tool 64.

In general terms, object detection unit 60 transmits probe signals directed generally ahead of drill string 66/cutting tool 64 during a horizontal boring operation. In addition, or in the alternative, object detection unit 60 transmits probe signals directed generally to the side or lateral of drill string 66/cutting tool 64. In one embodiment, object detection unit 60 provides for concurrent multi-directional transmission of probe signals, which may include probe signal transmission in forward, side, and/or rearward directions.

A single probe signal or multiple probe signals may transmitted by object detection unit 60. Multiple probe signals may be transmitted substantially simultaneously or in time succession (i.e., temporally separated probe signals). Multiple probe signals may be transmitted from one or more transmission locations on the drill pipe 66, on the cutting tool 64 or on both the drill pipe 66 and cutting tool 64 (i.e., spatially separated probe signals). The probe signals transmitted by object detection unit 60 are typically electromagnetic signals, but may also be acoustic or magnetic signals.

Object detection unit 60 also receives return signals resulting from the transmitted probe signals. Multiple return signals may be received substantially simultaneously or in time succession (i.e., temporally separated return signals). Multiple return signals may be received from one or more receive locations on the drill pipe 66, on the cutting tool 64 or on both the drill pipe 66 and cutting tool 64 (i.e., spatially separated return signals). The return signals received by object detection unit 60 are typically reflected signals resulting from the probe signal or signals.

The return signals may also represent signals generated by an object or utility coming within the sensitivity field of the object detection unit 60. For example, a utility may generate a natural or induced signal or field (e.g., a magnetic field resulting from current flowing through a conductor or a utility tag that generates a location/identification signal). Object detection unit 60, in this case, receives the natural or induced signals in addition to reflected signals resulting from the transmitted probe signals.

In accordance with one embodiment, object detection unit 60 includes a ground penetrating radar (GPR) system 62. In one configuration, GPR system 62 has a forward looking capability. In another configuration, GPR system 62 has a side looking capability. In a further configuration, GPR system 62 has both a forward and side looking capability. Various known impulse, stepped-frequency, and swept-frequency radar systems and methods may be adapted in accordance with the principles of the present invention, including those disclosed in U.S. Pat. Nos. 5,933,014; 5,769,503; 4,814,768; 4,686,475; and 4,430,653, all of which are hereby incorporated herein by reference in their respective entireties.

By way of example, a ground penetrating radar integrated circuit (IC) or chip may be employed as part of the object detection unit 60. In addition to use in object detection and avoidance, the GP-radar IC may be employed to perform subsurface surveying, geologic imaging, and geologic characterization, for example. The GP-radar IC may implement several different detection methodologies. A suitable GP-radar IC is manufactured by the Lawrence Livermore National Laboratory and is identified as the micropower-impulse radar (MIR). The MIR device is a low cost radar system on a chip that uses conventional electronic components. The radar transmitter and receiver are contained in a package measuring approximately two square inches. Other suitable radar IC's and detection methodologies are disclosed in U.S. Pat. Nos. 5,805,110; 5,774,091; and 5,757,320, which are hereby incorporated herein by reference in their respective entireties.

According to one embodiment of the present invention, a single object detection sensor of object detection unit 60 may be used to detect objects proximate the drill pipe 66/cutting tool 64. The single sensor may be positioned at a suitable location on the drill pipe 66/cutting tool 64 so as to maximize the detection capability or sensitivity of the sensor. For example, the single sensor may be located proximate the leading portion of drill pipe 66 or the leading edge of the cutting tool 64 in a forward-looking orientation. The sensor may also be located on the drill pipe 66/cutting tool 64 in a side-looking orientation, or at a location the provides a balance between forward-looking and side-looking orientations.

According to another embodiment, multiple object detection sensors of object detection unit 60 may be deployed at various locations within or on the drill pipe 66/cutting tool 64 from which object detection data may be concurrently or selectively derived. For example, a first sensor may be positioned at a suitable location on the drill pipe 66 and/or cutting tool 64 so as to maximize the forward-looking capability or sensitivity of this sensor. A second sensor may be positioned at a suitable location on the drill pipe 66 and/or cutting tool 64 so as to maximize the side-looking capability or sensitivity of this sensor.

Additional sensors may deployed in a forward-looking or side-looking orientation, or orientations having directivity between or differing from forward-looking and side-looking orientations to increase the detection capability of the object detection system. For example, four side-looking sensors located at 3:00, 6:00, 9:00, and 12:00 positions on the drill pipe 66 or cutting tool body may be utilized to provide continuous circumferential (i.e., 360 degree) imaging of the earth surrounding the cutting tool. By way of further example, two forward-looking sensors may be utilized to increase the field of forward directed sensitivity of the object detection system.

The return signals and/or data developed from the return signals are communicated to one or more above-ground receive locations via on-board communications transceiver 78. FIG. 2 depicts two of possibly several of such above-ground receive locations. A portable locator 56 equipped with a transceiver, for example, may be used to receive return signal information from object detection unit 60 via a wireless communication link 55. The return signal information received by locator 56 is transmitted to a communications transceiver 52 coupled to the control system 50 of HDD machine 20. Transmission of object detection information between object detection unit 60 and HDD machine 20 via locator 56 may be effected on a real-time basis. It is understood that locator 56 may instead represent one or more repeater stations, which are typically situated at fixed locations at a given bore site. If needed or desired, one or more of the repeaters may be re-positioned during the excavation effort.

In addition to receiving object detection data from object detection unit 60, locator 56 may be used to obtain location, depth, and/or orientation information concerning the drill pipe 66 and/or cutting tool 64. Examples of such known locator techniques are disclosed in U.S. Pat. Nos. 5,767,678; 5,764,062; 5,698,981; 5,633,589; 5,469,155; 5,337,002; and 4,907,658; all of which are hereby incorporated herein by reference in their respective entireties. These systems and techniques may be advantageously adapted to include object detection data transceiving and processing functionality consistent with the teachings and principles of the present invention.

Alternatively, or in addition, the communications transceiver 78 of the object detection unit 60 may transmit object detection information to HDD machine 20 via a communications link provided along the drill string 66. For example, a drill string conductor 51 may be provided to communicatively couple on-board communications transceiver 78 with HDD machine communications transceiver 52. In addition to providing a communications link, the drill string conductor 51 may further provide a power line for supplying power to the downhole electronics, such that a downhole power source is used as a back-up power source rather than a primary power source.

Figure 3:
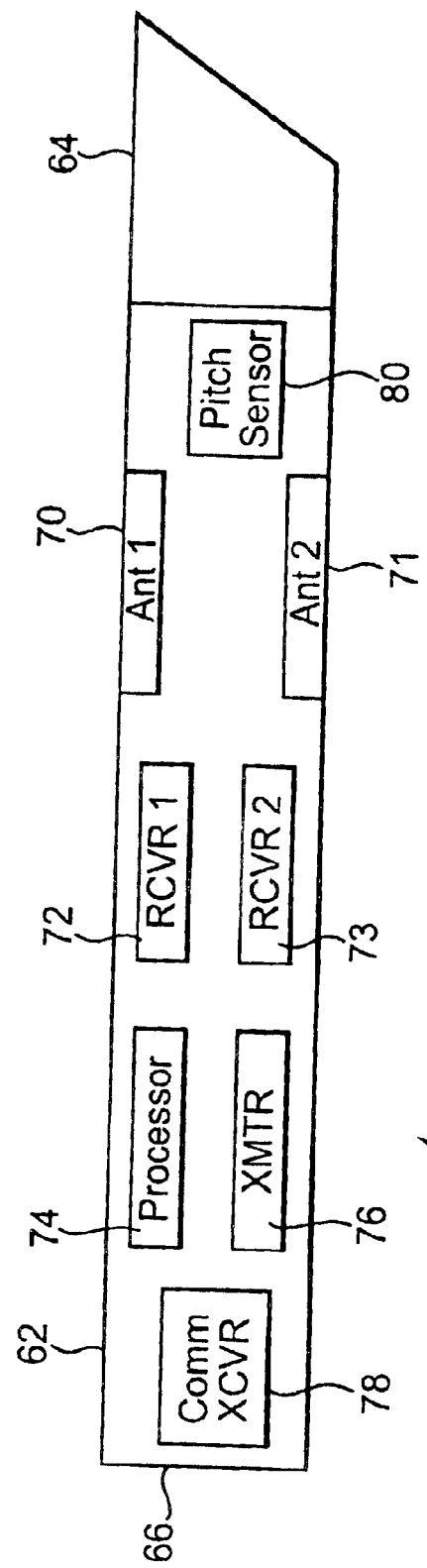
FIG. 3 shows various components of an object detection apparatus provided in a drill pipe/cutting tool according to an embodiment of the present invention.
Figure 4:
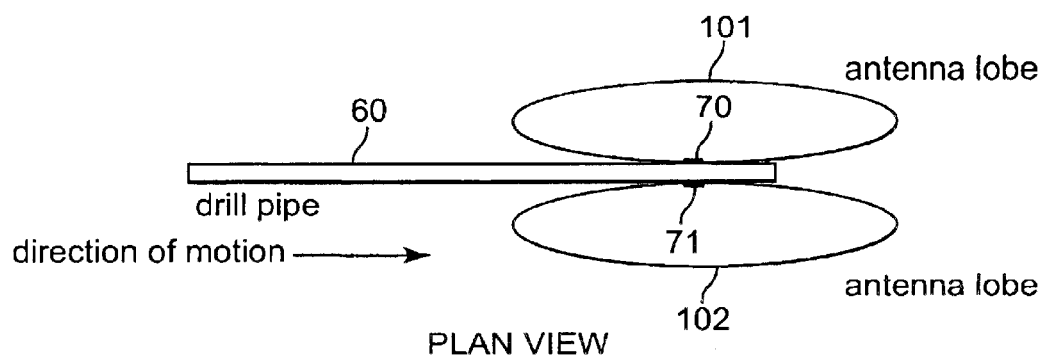
FIG. 4 is a plan view illustration of a detection field produced by a pair of forward looking radar provided on a drill pipe in accordance with an embodiment of the present invention.

FIG. 3 illustrates an embodiment of an object detection unit 60 situated within drill pipe 66 and near cutting tool 64. The object detection unit 60 depicted in FIG. 3 includes a transmit apparatus and a receive apparatus. In this embodiment, the transmit apparatus includes a single transmitter 76 and the receive apparatus includes two receivers 72, 73. In another embodiment, the transmit apparatus may include two transmitters and the receive apparatus may include two receivers 72, 73. In a further embodiment, the transmit apparatus may include two transmitters and the receive apparatus may include a single receiver 72. It will be appreciated that object detection unit 60 may include one or more transmitters and one or more receivers depending on the needs of a particular implementation or use. It will also be appreciated that the transmitters and receivers shown in FIG. 3 as separate components may instead be represented by transceiver components.

In FIG. 3, object detection unit 60 is shown to includes two antennas 70, 71. In this configuration, antenna 70 is coupled to receiver 72 and antenna 71 is coupled to receiver 73. Antennas 70 and 71 are also coupled to transmitter 76. Alternatively, two transmitters may be disposed in object detection unit 60, one transmitter being coupled to antenna 70 and the other transmitter being coupled to antenna 71.

Each of the antennas 70, 71 may represent individual transmit and receive antennae elements of a bistatic antennae or, alternatively, may each represent an individual monostatic antenna. It is understood that appropriate filtering and/or transmitter/receiver switching circuitry should be used in a monostatic antenna implementation to minimize undesirable ringing and reflective signal antenna saturation that may otherwise occur. The positioning of one or more antennae on the drill pipe 66 and/or cutting tool 64 may be selected to enhance the forward-looking and/or side-looking detection capability of the object detection unit 60.

According to one embodiment, the antennae 70, 71 constitute slot antennae in which a slot is provided in the metallic housing of drill pipe 66 and/or cutting tool 64 to receive an antenna element. The slot, which includes an antenna 70 or 71, may be covered with an epoxy material or other non-metallic material, preferably a hard dielectric material, that allows passage of electromagnetic waves through the protective material. A material suitable for this application is KEVLAR®, for example. Antennae 70, 71 that extend outside of the drill pipe 66 and/or cutting tool 64 may be covered by a protective non-metallic material (e.g., epoxy or KEVLAR®). The antennae, in this configuration, may be made to conform to the contour of the drill pipe 66 and/or cutting tool 64.

According to an embodiment of the present invention, object detection unit 60 includes a number of antennas, such as antennas 70, 71, which are provided in or on drill pipe 66 and/or cutting tool 64. Transmitter 76, according to this embodiment, produces electromagnetic probe signals which are transmitted from the drill pipe 66/cutting tool 64 via antennas 70, 71 and propagate into earth surrounding the drill pipe 66/cutting tool 64. The antennas 70, 71 receive reflected electromagnetic energy resulting from discontinuities in the ground medium encountered by the transmitted probe signals. Such ground medium discontinuities typically indicate the presence of changes in geologic strata or underground objects, such as buried utilities.

The reflected signal content received by the antennas 70, 71 are processed either partially or entirely by circuitry provided within or proximate the drill pipe 66/cutting tool 64. As shown in FIG. 3, return signal information is processed by on-board processor 74. The processed signal data are used to determine the presence of obstructions and/or geologic strata variations within the sensitivity range of the object detection unit 60. The processed signals may be used for a variety of purposes, such as modifying cutting tool movement to avoid contact with a detected subsurface object (e.g., a utility or unknown obstruction), identifying a detected object, and determining a location and/or orientation of an underground object. The processed signal data may further be combined with other drill pipe/cutting tool sensor data (e.g., location, pitch, yaw, roll sensor data).

In accordance with another embodiment of the present invention, and as is shown in FIG. 3, object detection unit 60 includes one or more orientation sensors, such as pitch sensor 80. Various known orientation sensors 80 may be used to derive location, pitch, yaw, and roll of the drill string 66/cutting tool 64, such as conductive liquid orientation sensors, angular rate sensors (accelerometers) of a mechanical, electro-mechanical, or semiconductor design, magnetometers, and gyroscopes, for example.

In one embodiment, the orientation sensor employed in object detection unit 60 includes a pitch sensor 80. The pitch sensor 80 may be mounted in the drill pipe 66 so that its axis of sensitivity is in alignment with or, alternatively, normal to a longitudinal axis of the drill pipe 66. The pitch sensor 80 generates an orientation signal corresponding to the horizontal orientation of the pitch sensor 80. In particular, the pitch sensor 80 generates a horizontal orientation signal which indicates that one or more of the antennae 70, 71 of the object detection unit 60 are oriented along a substantially horizontal plane relative to the earth's surface. According to this embodiment, return signals received by the object detection unit 60 are compared to one another in response to the horizontal orientation signal, which coincides with a time during which the antennae 70, 71 are oriented along a horizontal plane relative to the earth's surface.

In one configuration, object detection unit 60 includes two antennas 70 and 71 mounted about 180 degrees from one another about the circumference of the drill pipe 66 and/or cutting tool 64. Each antenna 70, 71 transmits and receives respective probe and return electromagnetic signals, such as pulsed GPR signals, using transmitter 76 and receivers 72, 73, respectively. The return signals received by antennas 70 and 71 are typically converted to digital form by an appropriate analog-to-digital converter, which may be integrated as part of processor 74. The processor 74 evaluates one or more characteristics (e.g., amplitude) of return signals acquired by antennas 70 and 71 to determine the presence or absence of an object or utility located ahead of the drill string 66/cutting tool 64.

For example, processor 74 evaluates the amplitude of return signals acquired by antennas 70 and 71. In one approach, the presence of a utility or other object located ahead of the drill string 66/cutting tool 64 is determined by the processor 74 when processor 74 determines that the amplitudes of return signals concurrently received at antennas 70 and 71 are substantially equal.

The cycle of transmitting probe signals, receiving return signals, and comparing return signal magnitudes may be repeated during each or over several drill string rotations to increase the reliability of the object detection methodology. For example, if processor 74 determines that the amplitudes of return signals concurrently received at antennas 70 and 71 are substantially equal (e.g., return signals differing in amplitude by 5 percent or less) over several drill string rotation cycles, there is an increased level of confidence that an actual buried utility or object has been detected. The cycle of transmitting probe signals, receiving return signals, and comparing return signal magnitudes may be repeated during each drill string rotation or over several rotations to increase the reliability of the object detection methodology.

In an embodiment in which an orientation sensor, such as pitch sensor 80, is employed, the presence of a utility or other object located ahead of the drill string 66/cutting tool 64 is determined when processor 74 determines that the amplitudes of return signals concurrently received at antennas 70 and 71 are substantially equal at a time during which the antennae 70, 71 are oriented along a horizontal plane relative to the earth's surface. In this case, the return signal amplitude comparison is performed by processor 74 in response to the horizontal orientation signal produced by orientation sensor 80.

FIGS. 4-8 illustrate a forward looking detection capability of an object detection system in accordance with an embodiment of the present invention. In this embodiment, two receive antennas 70 and 71 are employed to detect objects located ahead of the drill string 66/cutting tool 64. As shown in FIGS. 4-8, receive antenna 70 is implemented to exhibit a characteristic antenna lobe 101 biased in a forward direction relative to the longitudinal axis of the drill string 66. Receive antenna 71 is likewise implemented to exhibit a characteristic antenna lobe 102 biased in a forward direction relative to the longitudinal axis of the drill string 66.

Figure 5:
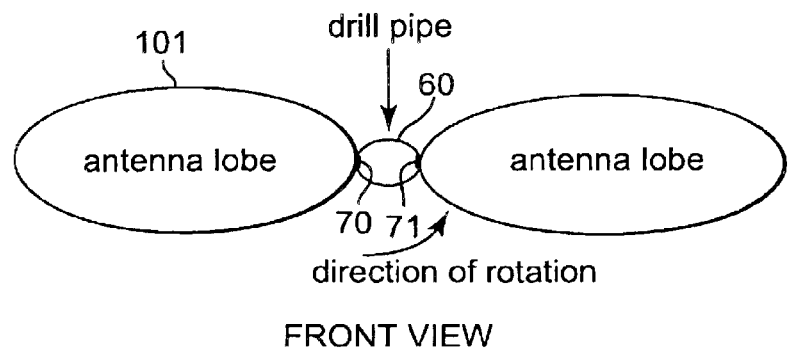
FIG. 5 is a front view of the detection field shown in FIG. 4.
Figure 6:
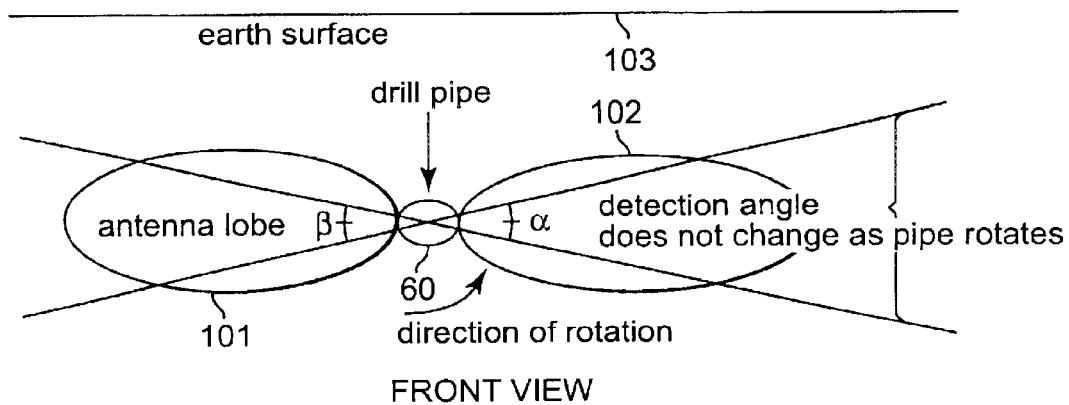
FIG. 6 is a front view of the detection field shown in FIG. 4, and further depicts a detection angle of the detection field.

FIG. 5 is a front view of drill pipe 66 equipped with object detection unit 60 and shows that antenna lobes 101 and 102, in addition to exhibiting a forward biased sensitivity, are also biased laterally or normal to the longitudinal axis of the drill pipe 66. FIG. 6 shows that detection angles $\alpha$ and $\beta$ of antenna lobes 102 and 101 do not change as the drill string 66/cutting tool 64 rotates.

Figure 7:
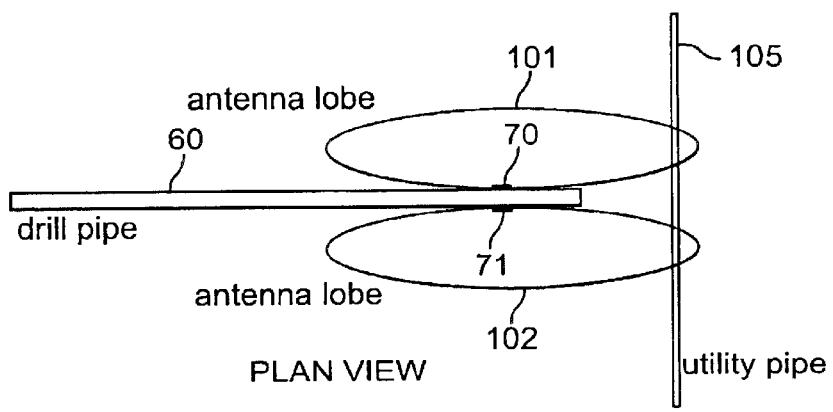
FIG. 7 is a plan view illustration of a buried utility pipe falling within the detection field produced by a pair of forward looking radar provided on a drill pipe in accordance with an embodiment of the present invention.

FIG. 7 illustrates a utility pipe 105 coming within the sensitivity field or range of antenna lobes 101 and 102. According to a previously discussed embodiment, antennas 70 and 71 concurrently transmit respective probe signals ahead of the advancing drill string 66/cutting tool 64. Return signals reflected from the utility pipe 105 are received by antennas 70 and 71. Amplitudes of these return signals, which result from simultaneously transmitted probe signals, are compared. If the comparison operation indicates that the return signal amplitudes are substantially equal, an alert signal is generated, indicating the presence of an actual utility pipe 105 located ahead of the advancing drill string 66/cutting tool 64.

Figure 8:
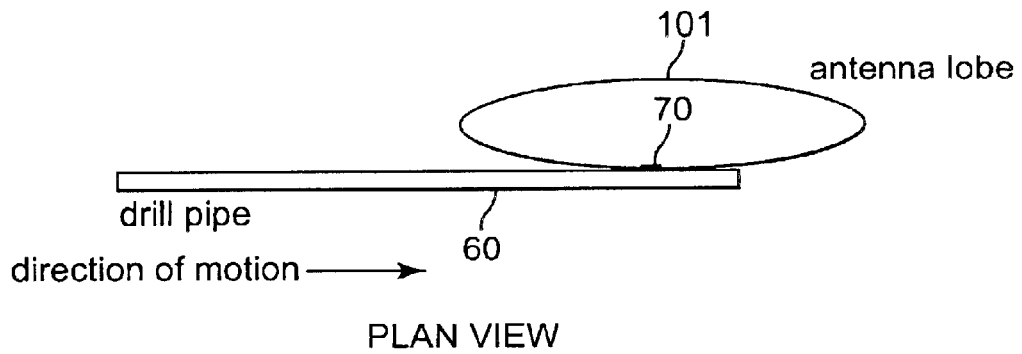
FIG. 8 is a plan view illustration of a detection field produced by a single forward looking radar provided on a drill pipe in accordance with an embodiment of the present invention.
Figure 9:
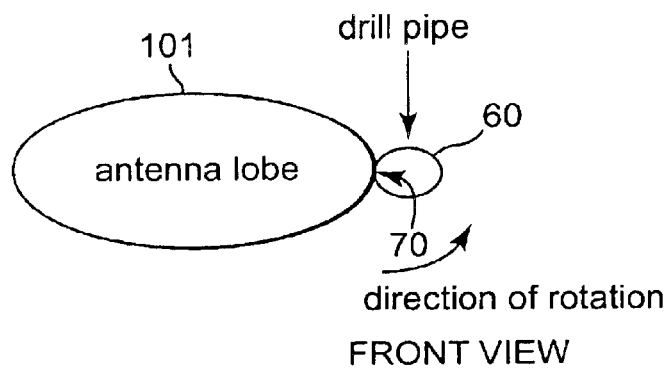
FIG. 9 is a front view of the detection field shown in FIG. 8.
Figure 10:
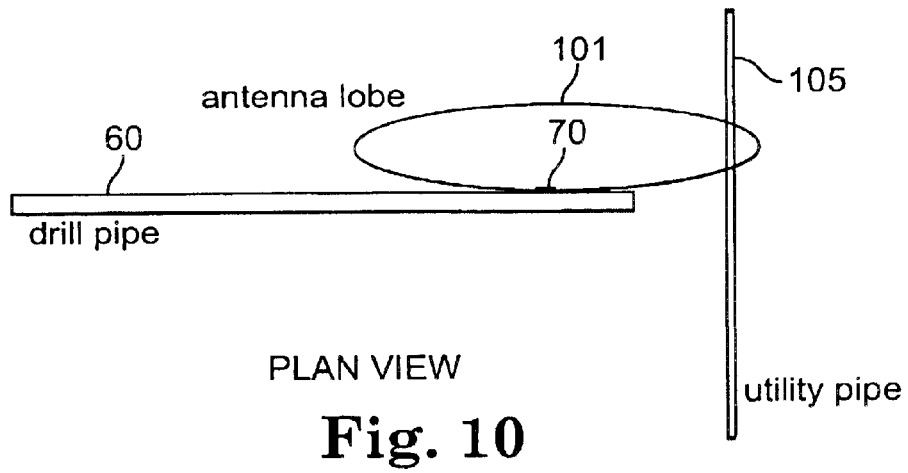
FIG. 10 is a plan view illustration of a buried utility pipe falling within the detection field produced by a single forward looking radar provided on a drill pipe in accordance with an embodiment of the present invention.

FIGS. 8-10 illustrate a forward looking detection capability of an object detection system in accordance with another embodiment of the present invention. In this embodiment, a single receive antenna 70 is employed to detect objects located ahead of the drill string 66/cutting tool 64. As shown in FIGS. 8-10, receive antenna 70 is implemented to exhibit a characteristic antenna lobe 101 biased in a forward direction relative to the longitudinal axis of the drill string 66. Receive antenna 70 also exhibits a side looking antenna lobe 101, as is shown in FIG. 9. In this embodiment, return signals are obtained over two or more transmit/receive cycles which occur over two or more drill string rotations. The amplitudes of two or more of these return signals may be compared in a manner similar to that described above to detect the presence of a pipe or object located forward or laterally of the drill string 66/cutting tool 64.

FIG. 11 illustrates an object detection unit 60 which employs a side looking detection capability. In this configuration, side looking antennas 77 and 79 exhibit respective antenna lobes 107 and 108 biased in a direction normal to a longitudinal axis of the drill string 66. The amplitudes of return signals received by antennas 77 and 79 may be compared in a manner similar to that described above to detect the presence of a pipe 106 or object located laterally of the drill string 66/cutting tool 64.

FIG. 12 illustrates an object detection unit 60 which employs both a forward looking detection capability and a side looking detection capability. In this configuration, forward looking antennas 70 and 71 exhibit respective antenna lobes 101 and 102 biased in a direction forward of the drill string 66/cutting tool 64. Side looking antennas 77 and 79 exhibit respective antenna lobes 107 and 108 biased in a direction normal to a longitudinal axis of the drill string 66. The amplitudes of return signals received by antennas 70, 71, 77, and 79 may be respectively compared in a manner similar to that described above to detect the presence of a laterally located pipe 106 and/or pipe 105 located ahead of the drill string 66/cutting tool 64.

According to one embodiment, the object detection unit 60 is employed to detect utility pipes, cables, and other conduits located ahead of and/or to the side of drill string/ cutting tool movement. In this embodiment, the object detection unit 60, during a transmit cycle, transmits a pulsed electromagnetic signal ahead of and/or to the side of the forward moving and/or rotating drill string 66/cutting tool 64. During a receive cycle, return signals are received by the object detection unit 60 and processed by processor 74 and/or HDD machine control system 50. Once a pipe or other obstruction is detected, the HDD machine control system modifies HDD machine activity in a number of different ways, such as by reducing the displacement rate of the drill string 66/cutting tool 64 or halting drill string/ cutting tool movement altogether. After investigating the detected utility and determining how to avoid the utility, such as by removing the utility if possible or steering away from the utility, HDD machine activity may be resumed.

Figure 13:
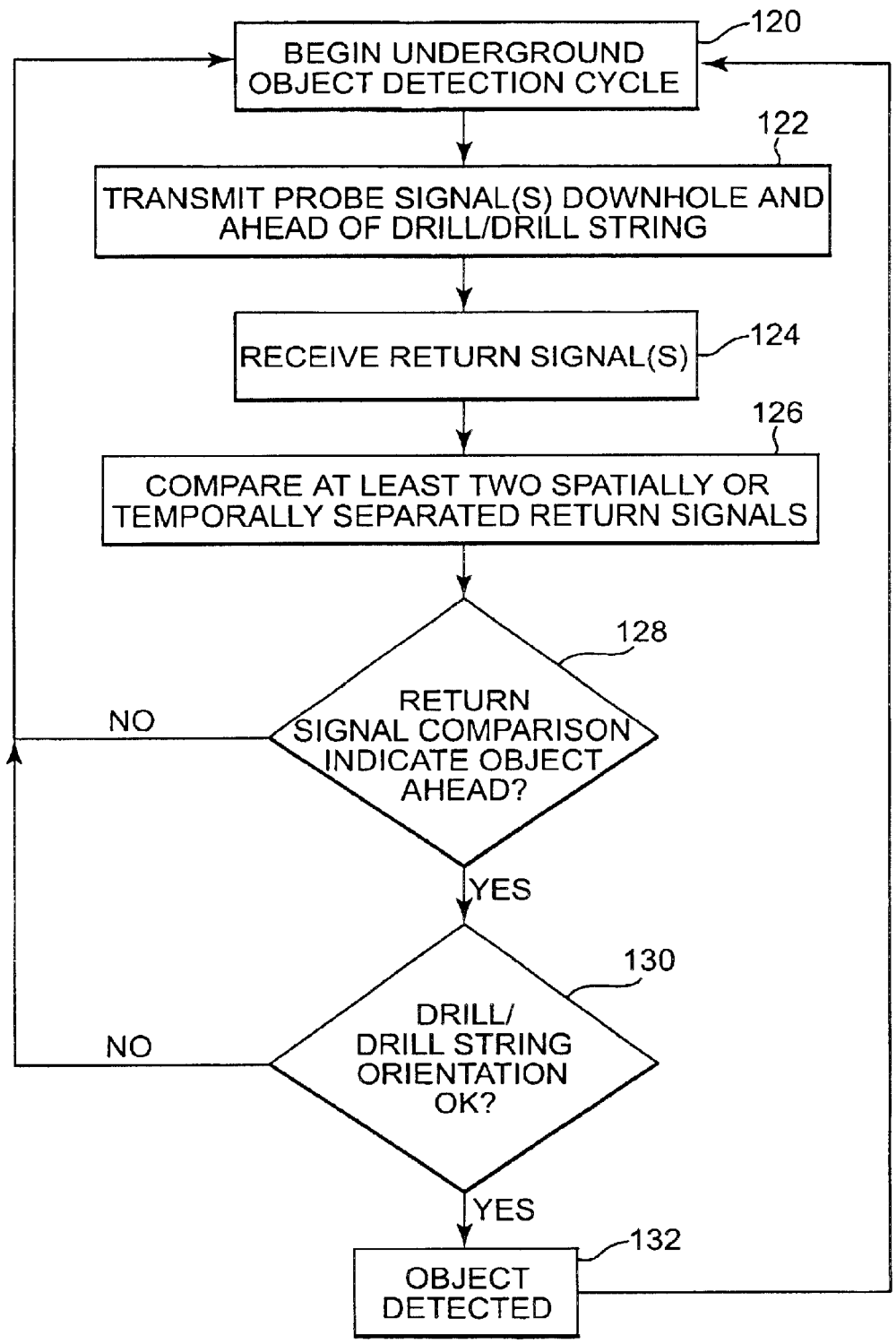
FIGS. 13–17 are respective flow diagrams illustrating various processes involved in detecting an underground object in accordance with several embodiments of the present invention.

FIGS. 13-18 are flow diagrams illustrating various methods of detecting underground objects and modifying HDD machine activity in response to detected objects in accordance with the principles of the present invention. With reference to FIG. 13, an underground object detection cycle is initiated 120 during a horizontal drilling effort. In this embodiment, one or more probe signals are transmitted 122 downhole ahead of the drill/drill string. Return signals resulting from the probe signals are received 124. A least two spatially or temporally separated return signals are compared 126. If the return signal comparison operation 128 does not indicate the presence of an object located ahead of the drill/drill string, the object detection cycle 120 is repeated. If 128 the return signal comparison operation 126 indicates the presence of an object located ahead of the drill/drill string, an alert signal is generated indicating the confirmation of the detected object 132 and appropriate steps are taken to modify or halt HDD machine activity.

If 128 the return signal comparison operation 126 indicates the presence of an object located ahead of the drill/drill string, a determination 130, which may be optional, is made to confirm that the drill/drill string orientation is appropriate for using the return signal comparison result. If not, the object detection cycle 120 is repeated until the drill/drill string is in the proper orientation. If 128 the return signal comparison operation 126 indicates the presence of an object located ahead of the drill/drill string during a time in which the drill/drill string is in the proper orientation, an actual object is considered detected 132 and an alert signal is generated. Appropriate steps are taken to modify or halt HDD machine activity in response to the alert signal. The detection cycle 120 is repeated when excavation resumes.

Figure 14:
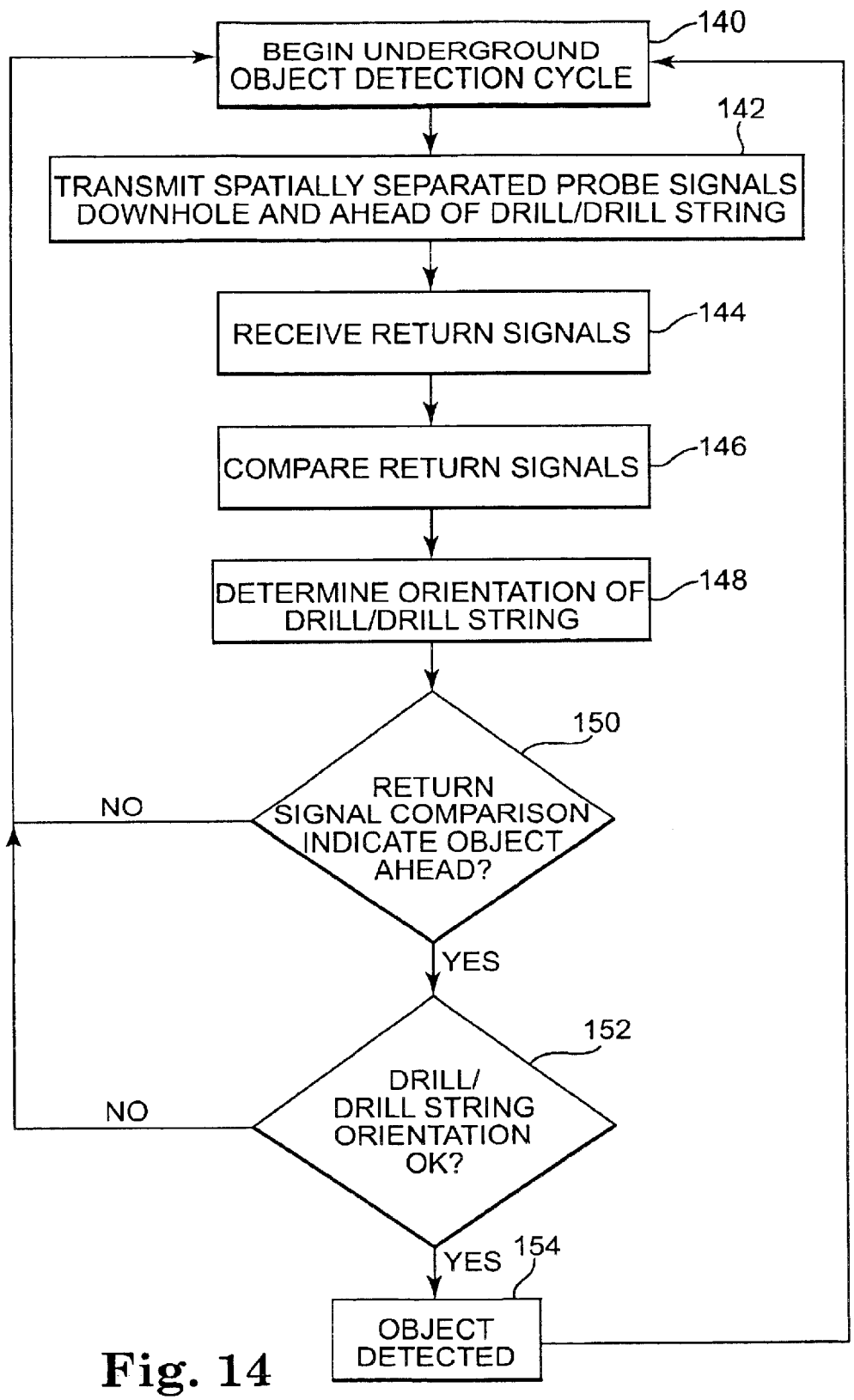

FIG. 14 illustrates another method for detecting underground objects in accordance with the present invention. In this embodiment, an object detection cycle is initiated 140 by transmitting 142 two spatially separated probe signals downhole and ahead of the drill/drill string. Return signals resulting from the two spatially separated probe signals are received 144 and compared 146. The orientation of the drill/drill string is determined 148, which may be an optional step. If 150 the return signal comparison operation 146 indicates the presence of an object located ahead of the drill/drill string, an alert signal is generated indicating the confirmation of the detected object 154 and appropriate steps are taken to modify or halt HDD machine activity.

If 150 the return signal comparison operation 146 indicates the presence of an object located ahead of the drill/drill string, a determination 148/152, which may be optional, is made to confirm that the drill/drill string orientation is appropriate for performing the return signal comparison operation 146. If not, the object detection cycle 140 is repeated until the drill/drill string is in the proper orientation. If 152 the return signal comparison operation 146 indicates the presence of an object located ahead of the drill/drill string during a time in which the drill/drill string is in the proper orientation, an actual object is considered detected 154 and an alert signal is generated. Appropriate steps are taken to modify or halt HDD machine activity in response to the alert signal. The detection cycle 140 is repeated when excavation resumes.

Figure 15:
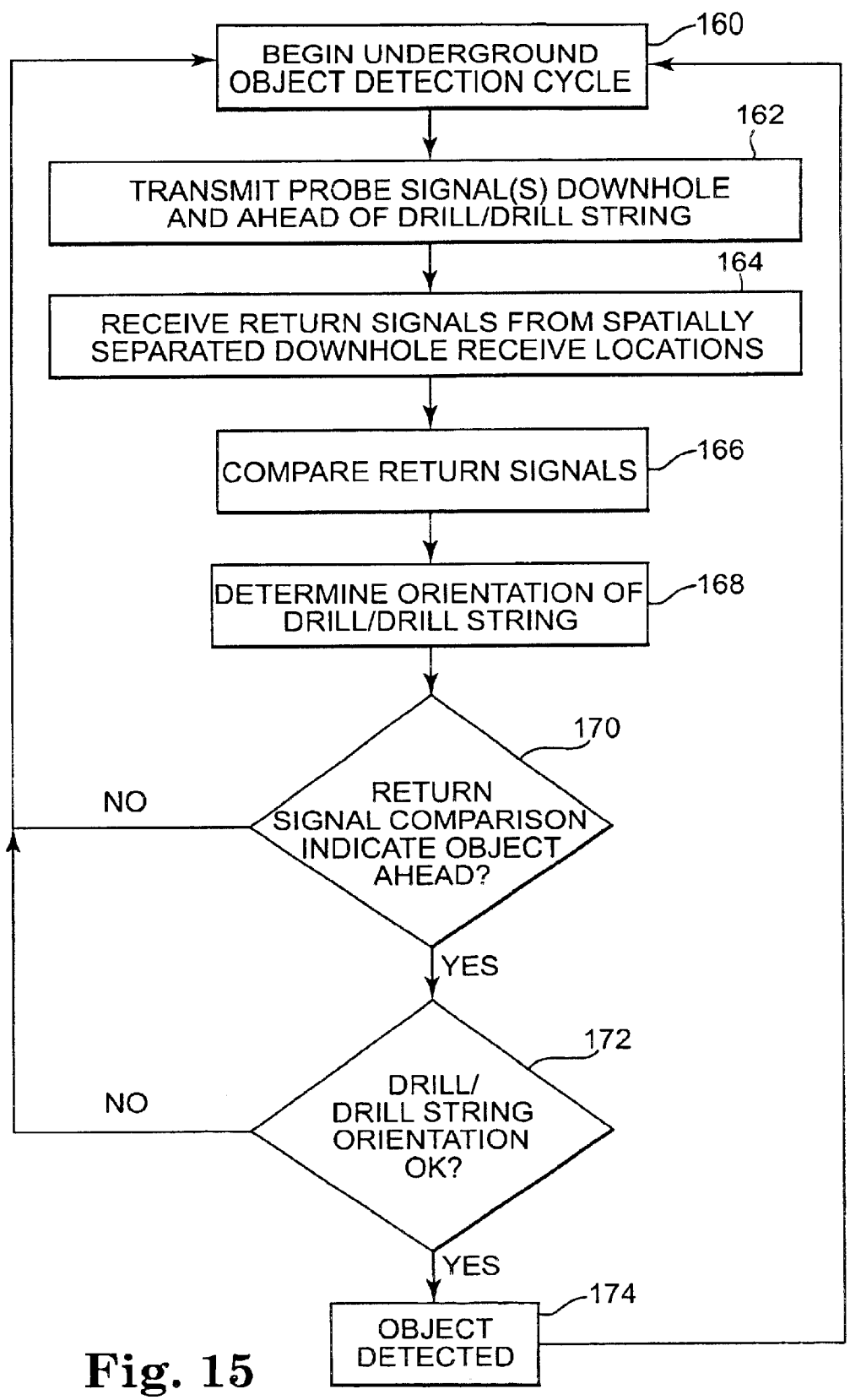

FIG. 15 illustrates a further method for detecting underground objects in accordance with the present invention. In this embodiment, an object detection cycle is initiated 160 by transmitting 162 one or more probe signals downhole and ahead of the drill/drill string. Return signals resulting from the probe signals are received 164 at at least two spatially separated downhole receive locations. These return signals are compared 166. The processes described in blocks 168-174 are then performed in a manner previously described with respect to FIGS. 13 and 14.

Figure 16:
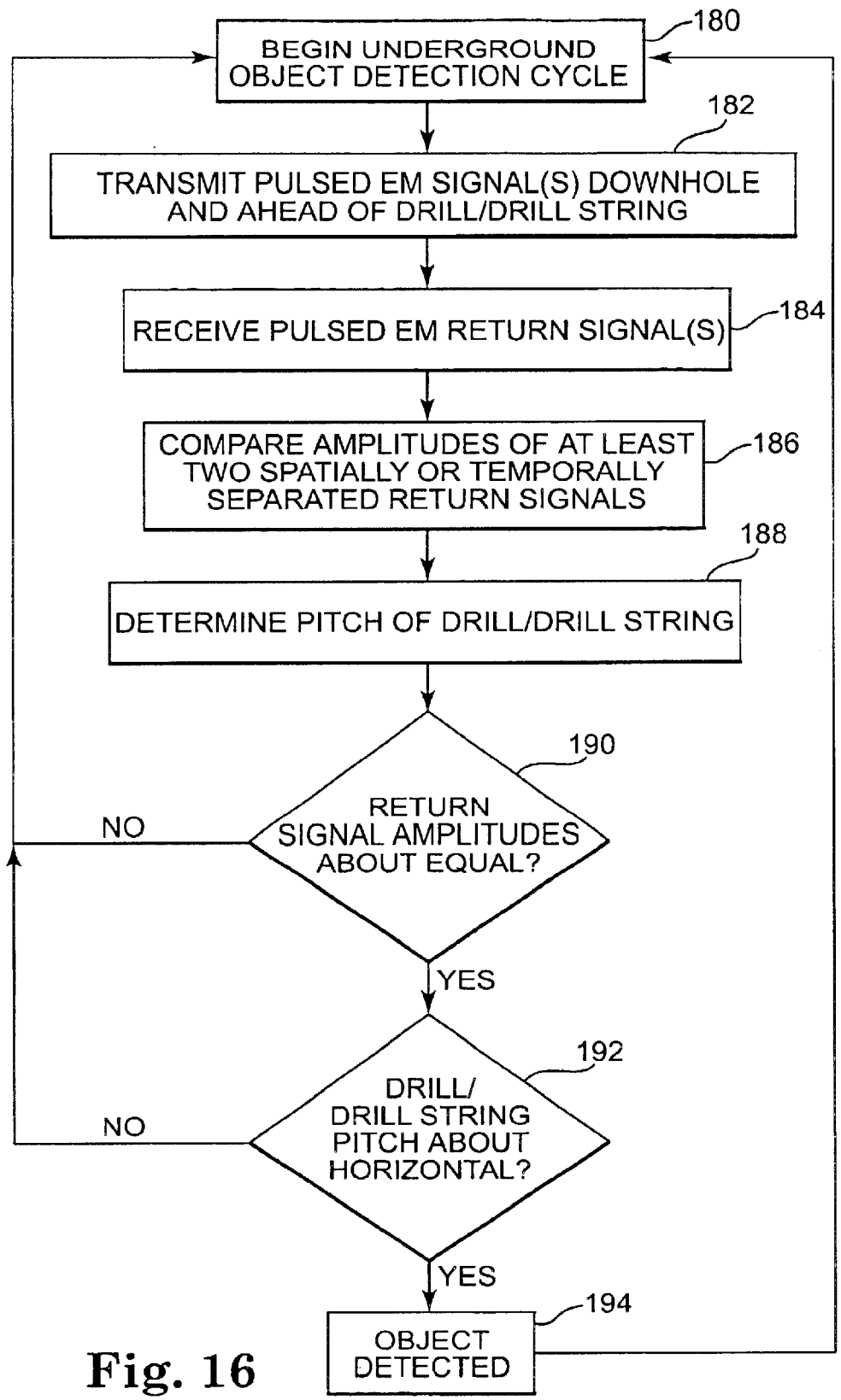

FIG. 16 illustrates yet another method for detecting underground objects in accordance with the present invention. In this embodiment, an object detection cycle is initiated 180 by transmitting 182 one or more pulsed electromagnetic (EM) probe signals (e.g., GPR probe signals) downhole and ahead of the drill/drill string. Return pulsed EM signals resulting from the pulsed EM probe signals are received 184.

The amplitudes of the pulsed EM return signals are compared 186 and, if 190 found to be substantially equal, an alert signal is generated indicating detection 194 of an actual object located ahead of the drill/drill string. Drill/drill string pitch, as implicated in blocks 188 and 192, may also be used in a manner described above. Appropriate steps are taken to modify or halt HDD machine activity in response to the alert signal. The detection cycle 180 is repeated when excavation resumes.

Figure 17:
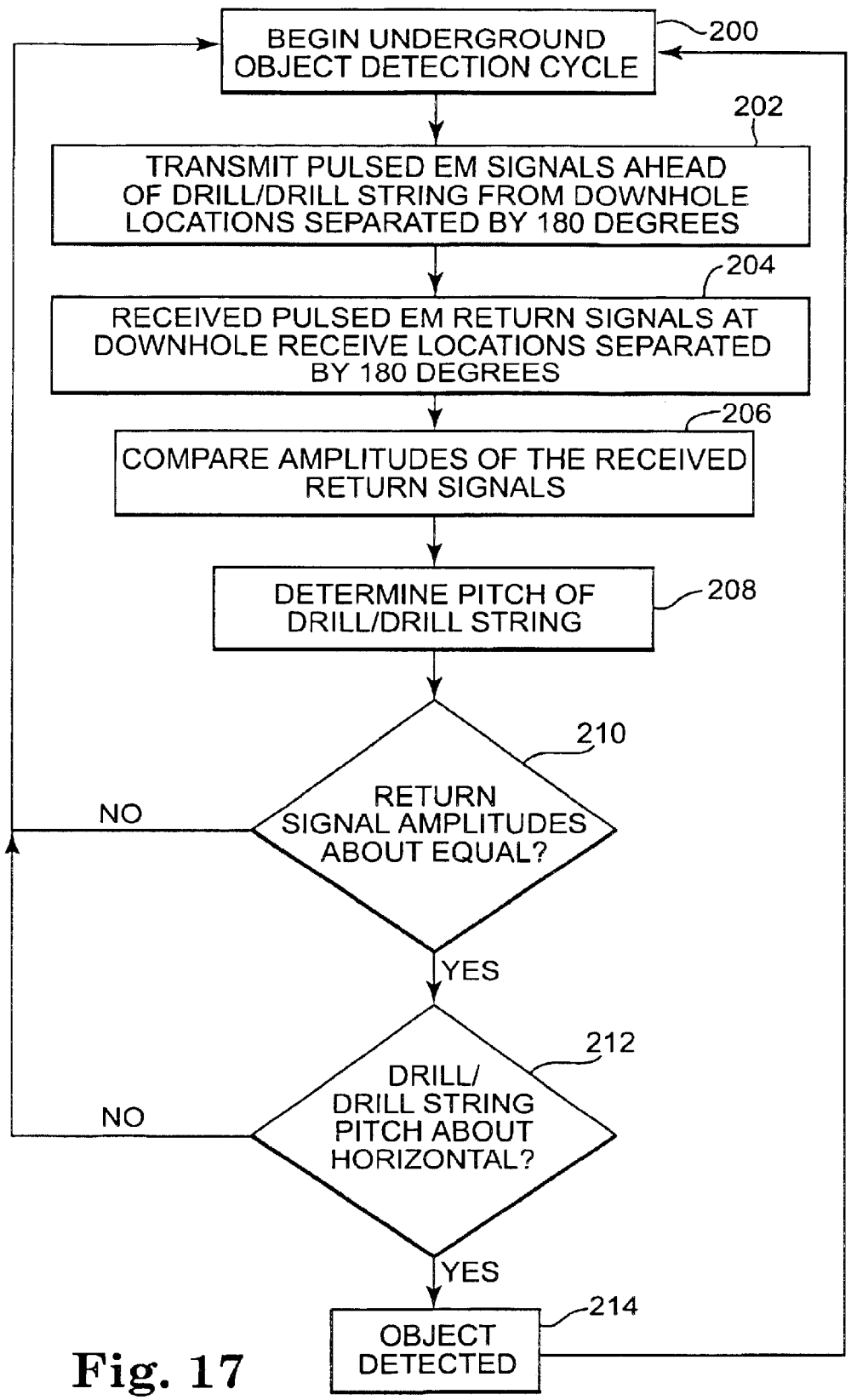

FIG. 17 illustrates a further method for detecting underground objects in accordance with the present invention. In this embodiment, an object detection cycle is initiated 200 by transmitting 202 one or more pulsed electromagnetic (EM) probe signals (e.g., GPR probe signals) ahead of the drill/drill string from downhole locations separated circumferentially by 180 degrees. Return pulsed EM signals resulting from the pulsed EM probe signals are received 204 at downhole locations separated circumferentially by about 180 degrees.

The amplitudes of the pulsed EM return signals are compared 206 and, if 210 found to be substantially equal, an alert signal is generated indicating detection 214 of an actual object located ahead of the drill/drill string. Drill/drill string pitch, as implicated in blocks 208 and 212, may also be used in a manner described above. Appropriate steps are taken to modify or halt HDD machine activity in response to the alert signal. The detection cycle 200 is repeated when excavation resumes.

It is understood that the methods discussed above with respect to detection of objects located ahead of the drill/drill string are likewise applicable to detection of objects located laterally of the drill/drill string. Further, it is understood that forward and side object detection processes may be implemented in combination to provide for both forward and side looking detection capabilities.

Figure 18:
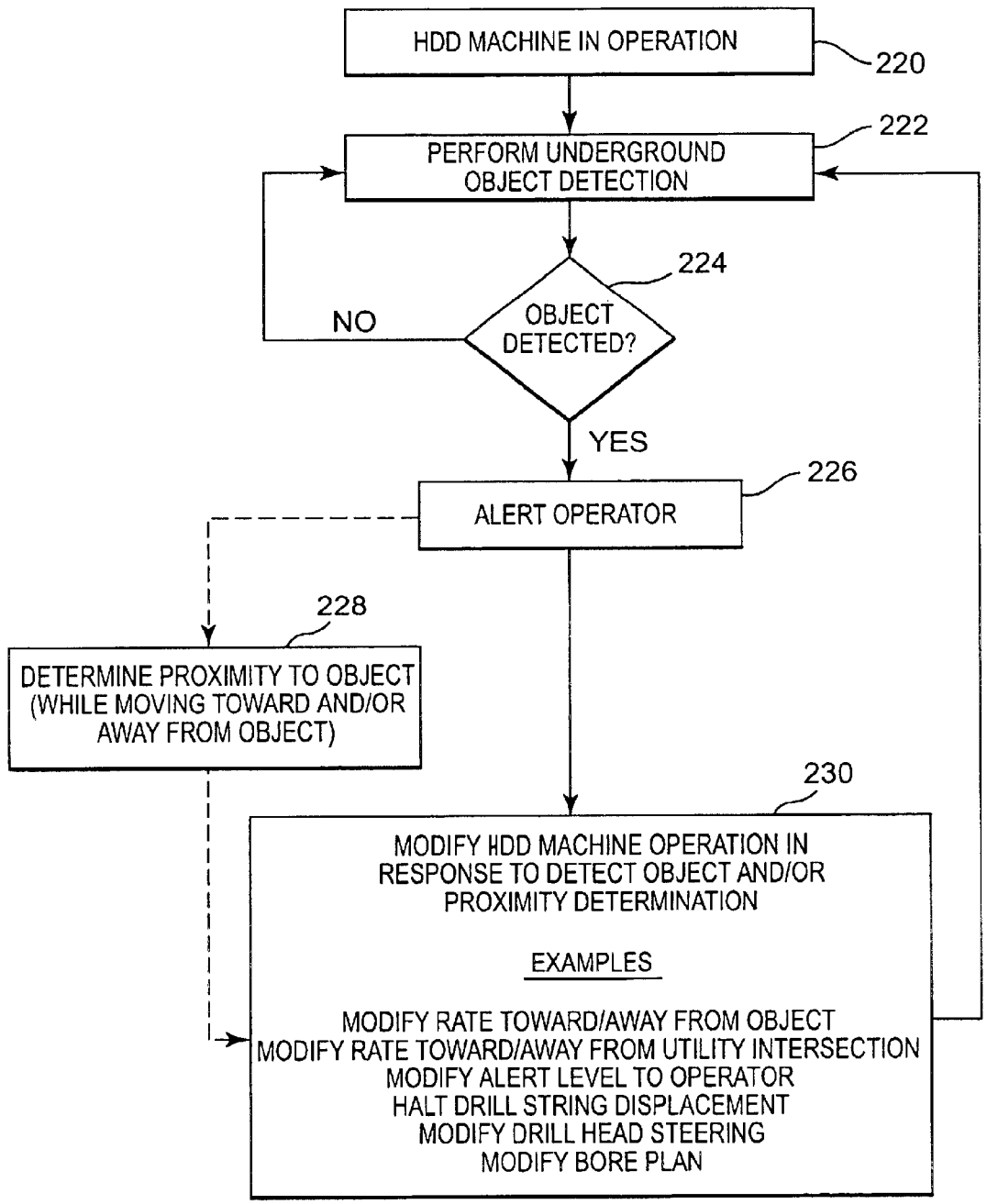
FIG. 18 is a flow diagram illustrating various processes involved in modifying the operation of an HDD machine in response to detection of a buried object in accordance with an embodiment of the present invention.

FIG. 18 illustrates various processes associated with the modification of HDD machine activity in response to detection of an underground object. During HDD machine operation 220, an underground object detection procedure according to the principles of the present invention is performed 222. If an object is detected 224, either forward of, or lateral to, the drill/drill string, the operator is alerted 226, such as by an audio, visual, and/or tactile (e.g., vibration) warning indication. The HDD machine controller also receives an alert signal indicating the detection of a buried object in proximity with the drill/drill string. In one embodiment, the distance or proximity of the detected object relative to the drill/drill string is determined 228, such as by time of flight or other known techniques.

In response to detection of a buried object, activity of the HDD machine is modified 230. HDD machine activity may be modified in a number of ways, which may be dependent on the relative distance between the detected object and the drill/drill string. For example, the rate of drill/drill string displacement when moving toward or away from the detected object may be modified in a step-wise or continuous manner. When moving toward a detected object, for example, the drill/drill string displacement rate may be progressively reduced or altogether halted. When moving away from a detected object, by way of further example, the drill/drill string displacement rate may be progressively increased, such that a nominal displacement rate is resumed when the detected object no longer poses a risk.

The alarm or alert level presented to the operator may be modified as a function of proximity between the detected object and drill/drill string. An alarm or series of alarms may progress between several criticality levels ranging between non-critical and critical levels as the drill/drill string moves toward and away from a detected object.

The HDD machine may adjusted steering of the drill/drill string in a direction away from a detected object in response to an alert signal. By way of example, a bore plan developed for a given excavation site may be automatically modified by the HDD machine or other bore plan processing device to avoid contact between the drill/drill string and a detected object.

The object detection apparatus and methodology of the present invention may be advantageously employed in the fields of horizontal directional drilling, geophysical evaluation, and object identification, among other fields. The principles of the present invention may be employed together with the concepts, apparatuses, and methodologies disclosed in commonly assigned U.S. Pat. Nos. 5,720,354, 5,904,210, 5,819,859, 5,553,407, 5,704,142, and 5,659,985, all of which are hereby incorporated herein by reference in their respective entireties. For example, an exemplary swept-step detection methodology for detecting an underground object and determining the range of the underground object using ground penetrating radar is described in U.S. Pat. No. 5,867,117, which is hereby incorporated herein by reference in its entirety.

It will, of course, be understood that various modifications and additions can be made to the preferred embodiments discussed hereinabove without departing from the scope of the present invention. Accordingly, the scope of the present invention should not be limited by the particular embodiments described above, but should be defined only by the claims set forth below and equivalents thereof.

What is claimed is:

1. An underground object detection system for use with a horizontal directional drilling (HDD) machine, comprising:
a drill pipe configured to cooperate with the HDD machine to produce a horizontal bore;
a transmit apparatus, the transmit apparatus provided with the drill pipe and transmitting electromagnetic probe signals from the drill pipe;
a receive apparatus, the receive apparatus provided with the drill pipe and receiving electromagnetic return signals resulting from the probe signals; and
a processor coupled to the transmit and receive apparatuses, the processor comparing amplitudes of at least some of the return signals acquired at a time when one or more antennae of the transmit and receive apparatuses are oriented along a substantially horizontal plane relative to a surface of the earth, and generating an alert signal indicative of a detected object in proximity with the drill pipe in response to the processor comparing return signals having about the same amplitude.

2. The apparatus of claim 1, wherein the transmit apparatus comprises two transmit antennas situated apart from one another on the drill pipe.

3. The apparatus of claim 2, wherein the receive apparatus comprises a single receive antenna.

4. The apparatus of claim 2, wherein the receive apparatus comprises two receive antennas.

5. The apparatus of claim 2, wherein the two transmit antennas are situated about 180 degrees from one another on the drill pipe.

6. The apparatus of claim 1, wherein the receive apparatus comprises two receive antennas situated apart from one another on the drill pipe.

7. The apparatus of claim 6, wherein the transmit apparatus comprises a single transmit antenna.

8. The apparatus of claim 6, wherein the transmit apparatus comprises two transmit antennas.

9. The apparatus of claim 6, wherein the two receive antennas are situated about 180 degrees from one another on the drill pipe.

10. The apparatus of claim 1, wherein the transmit apparatus and receive apparatus share one or more common antennae.

11. The apparatus of claim 1, further comprising an orientation sensor provided with the drill pipe, the orientation sensor generating a horizontal orientation signal indicating that the one or more antennae of the transmit and receive apparatuses are oriented along the substantially horizontal plane relative to the surface of the earth, the processor comparing the return signal amplitudes in response to the horizontal orientation signal.

12. The apparatus of claim 1, wherein the drill pipe comprises a cutting tool, and the receive and transmit apparatuses are provided with the cutting tool.

13. The apparatus of claim 1, wherein the drill pipe comprises a cutting tool, and the drill pipe and the cutting tool are respectively provided with receive and transmit apparatuses.

14. The apparatus of claim 1, wherein the processor comprises a first processor provided at the drill pipe and a second processor provided at the HDD machine.

15. The apparatus of claim 14, wherein the first processor communicates the return signals to the second processor, and the second processor generates the alert signal.

16. The apparatus of claim 14, wherein the first processor communicates a processed set of data developed from the return signals to the second processor, and the second processor receives the processed data set from the first processor for further processing.

17. The apparatus of claim 1, wherein:
the transmit apparatus transmits electromagnetic probe signals lateral to the drill pipe;
the receive apparatus receives electromagnetic lateral return signals resulting from the laterally transmitted probe signals; and
the processor compares amplitudes of at least some of the lateral return signals, and generates an alert signal indicative of a detected object in proximity with a side of the drill pipe in response to the processor comparing lateral return signals having about the same amplitude.

18. The apparatus of claim 1, wherein the transmit and receive apparatuses define an impulse ground penetrating radar apparatus.

19. The apparatus of claim 1, wherein the transmit and receive apparatuses define a stepped-frequency ground penetrating radar apparatus.

20. The apparatus of claim 1, wherein the transmit and receive apparatuses define a swept-frequency ground penetrating radar apparatus.

21. An underground object detection system, comprising:
a horizontal directional drilling (HDD) machine;
a drill pipe coupled to the HDD machine and controlled by the HDD machine to produce a horizontal bore;
a transmit apparatus, the transmit apparatus provided with the drill pipe and transmitting electromagnetic probe signals from the drill pipe;
a receive apparatus, the receive apparatus provided with the drill pipe and receiving electromagnetic return signals resulting from the probe signals;
a first processor provided proximate the drill pipe and coupled to the transmit and receive apparatuses, the first processor receiving return signal data from the receive apparatus; and
a second processor provided at the HDD machine, one or both of the first and second processors comparing amplitudes of at least some of the return signals acquired at a time when one or more antennae of the transmit and receive apparatuses are oriented along a substantially horizontal plane relative to a surface of the earth, and generating an alert signal indicative of a detected object in proximity with the drill pipe in response to comparing return signals having about the same amplitude, and the second processor modifying movement of the drill pipe in response to an alert signal.

22. The apparatus of claim 21, wherein the transmit apparatus and receive apparatus share one or more common antennae.

23. The apparatus of claim 21, wherein the transmit and receive apparatuses each comprise two antennas situated apart from one another on the drill pipe.

24. The apparatus of claim 21, wherein the transmit apparatus comprises two transmit antennas situated about 180 degrees from one another on the drill pipe.

25. The apparatus of claim 21, wherein the receive apparatus comprises two receive antennas situated about 180 degrees from one another on the drill pipe.

26. The apparatus of claim 21, further comprising an orientation sensor provided with the drill pipe, the orientation sensor generating a horizontal orientation signal indicating that the one or more antennae of the transmit and receive apparatuses are oriented along the substantially horizontal plane relative to the surface of the earth, the first or second processor comparing return signal amplitudes in response to the horizontal orientation signal.

27. The apparatus of claim 21, wherein the drill pipe comprises a cutting tool, and the receive and transmit apparatuses are provided with the cutting tool.

28. The apparatus of claim 21, wherein the drill pipe comprises a cutting tool, and the drill pipe and the cutting tool are respectively provided with receive and transmit apparatuses.

29. The apparatus of claim 21, wherein the first processor compares amplitudes of at least some of the return signals and, in response to comparing return signals having about the same amplitude, generates the alert signal.

30. The apparatus of claim 21, wherein the second processor compares amplitudes of at least some of the return signals and, in response to comparing return signals having about the same amplitude, generates the alert signal.

31. The apparatus of claim 21, wherein the second processor modifies movement of the drill pipe by halting movement of the drill pipe in response to the alert signal.

32. The apparatus of claim 21, wherein the second processor modifies movement of the drill pipe by reducing a rate of drill pipe displacement in response to the alert signal.

33. The apparatus of claim 21, wherein the second processor modifies movement of the drill pipe by modifying steering of the drill pipe in response to the alert signal.

34. The apparatus of claim 21, wherein the second processor, in response to the alert signal, modifies a rate of drill pipe displacement as a function of drill pipe proximity with the object.

35. The apparatus of claim 21, wherein the first or second processor modifies the alert signal presented to an operator of the HDD machine as a function of drill pipe proximity with the object.

36. The apparatus of claim 21, wherein the transmit and receive apparatuses define an impulse ground penetrating radar apparatus.

37. The apparatus of claim 21, wherein the transmit and receive apparatuses define a stepped-frequency ground penetrating radar apparatus.

38. The apparatus of claim 21, wherein the transmit and receive apparatuses define a swept-frequency ground penetrating radar apparatus.

39. The apparatus of claim 21, wherein:
the transmit apparatus transmits electromagnetic probe signals lateral to the drill pipe;
the receive apparatus receives electromagnetic lateral return signals resulting from the laterally transmitted probe signals; and the first or second processor compares amplitudes of at least some of the lateral return signals, and generates an alert signal indicative of a detected object in proximity with a side of the drill pipe in response to the first or second processor comparing lateral return signals having about the same amplitude.

40. A method of detecting an underground object for use with a horizontal directional drilling (HDD) machine, comprising:

moving a drill pipe and cutting tool using the HDD machine to produce a horizontal bore;

transmitting, from one or both of the drill pipe and cutting tool, electromagnetic probe signals;

receiving, at one or both of the drill pipe and cutting tool, electromagnetic return signals resulting from the probe signals;

comparing amplitudes of at least some of the return signals received at a time when one or more antennae provided at the drill pipe or cutting tool are oriented along a substantially horizontal plane relative to a surface of the earth; and generating an alert signal indicative of a detected object in proximity with one or both of the drill pipe and cutting tool in response to comparing return signals having about the same amplitude.

41. The method of claim 40, wherein transmitting the probe signals comprises simultaneously transmitting a probe signal from at least two spatially separated locations of one or both of the drill pipe and cutting tool.

42. The method of claim 41, wherein receiving the return signals comprises receiving return signals at at least two spatially separated locations of one or both of the drill pipe and cutting tool.

43. The method of claim 40, wherein transmitting the probe signals comprises transmitting a probe signal from at least one location of the drill pipe or cutting tool during each of a plurality of drill pipe rotations.

44. The method of claim 43, wherein receiving the return signals comprises receiving return signals at at least one location of the drill pipe or cutting tool.

45. The method of claim 43, wherein receiving the return signals comprises receiving return signals at at least two spatially separated locations of one or both of the drill pipe and cutting tool.

46. The method of claim 40, wherein transmitting the probe signals comprises transmitting temporally separated probe signals from at least two locations of one or both of the drill pipe and cutting tool.

47. The method of claim 46, wherein receiving the return signals comprises receiving return signals at at least one location of the drill pipe or cutting tool.

48. The method of claim 40, further comprising generating a horizontal orientation signal indicating that the probe signals and return signals are respectively transmitted and received along the substantially horizontal plane relative to the surface of the earth, and comparing return signal amplitudes further comprises comparing amplitudes of at least some of the return signals in response to the horizontal orientation signal.

49. The method of claim 40, further comprising modifying movement of the drill pipe and cutting tool in response to the alert signal.

50. The method of claim 40, further comprising halting movement of the drill pipe and cutting tool in response to the alert signal.

51. The method of claim 40, further comprising reducing a rate of drill pipe and cutting tool displacement in response to the alert signal.

52. The method of claim 40, further comprising modifying steering of the drill pipe and cutting tool in response to the alert signal.

53. The method of claim 40, further comprising modifying a rate of drill pipe and cutting tool displacement as a function of drill pipe or cutting tool proximity with the object in response to the alert signal.

54. The method of claim 40, further comprising modifying the alert signal presented to an operator of the HDD machine as a function of drill pipe or cutting tool proximity with the object in response to the alert signal.

55. The method of claim 40, further comprising:

transmitting electromagnetic probe signals lateral to the drill pipe;

receiving electromagnetic lateral return signals resulting from the laterally transmitted probe signals;

comparing amplitudes of at least some of the lateral return signals;

and generating an alert signal indicative of a detected object in proximity with a side of the drill pipe in response to comparing lateral return signals having about the same amplitude.

56. The method of claim 40, wherein the probe and return signals comprise impulse ground penetrating radar signals.

57. The method of claim 40, wherein the probe and return signals comprise stepped-frequency ground penetrating radar signals.

58. The method of claim 40, wherein the probe and return signals comprise swept-frequency ground penetrating radar signals.

59. The method of claim 40, further comprising modifying delivery of drilling fluid through the drill pipe in response to the alert signal.

60. The method of claim 40, further comprising terminating delivery of drilling fluid through the drill pipe in response to the alert signal.

* * * * *

UNITED STATES PATENT AND TRADEMARK OFFICE
CERTIFICATE OF CORRECTION

PATENT NO.        : 6,833,795 B1                                        Page 1 of 1
APPLICATION NO. : 09/727356
DATED             : December 21, 2004
INVENTOR(S)       : Johnson et al.

It is certified that error appears in the above-identified patent and that said Letters Patent is hereby corrected as shown below:

TITLE PAGE, ITEM (73)

Assignee should read:  Geophysical Survey Systems, Inc., North Salem, NH and
                       Vermeer Manufacturing Company, Pella, IA.

Signed and Sealed this

Eighteenth Day of July, 2006

JON W. DUDAS
*Director of the United States Patent and Trademark Office*